United States Patent [19]

Adey et al.

[11] Patent Number: 4,459,955

[45] Date of Patent: Jul. 17, 1984

[54] ELECTRONIC CONTROL SYSTEM

[75] Inventors: Anthony J. Adey, Gravesend, England; Alistair J. F. Ritchie, New Mills, Scotland; Michael J. Wigglesworth, Hampsted, England

[73] Assignee: Lucas Industries Public Limited Company, Birmingham, England

[21] Appl. No.: 482,895

[22] Filed: Apr. 7, 1983

[30] Foreign Application Priority Data

May 12, 1982 [GB] United Kingdom ................. 8213730

[51] Int. Cl.³ ............................................. F02D 31/00
[52] U.S. Cl. .................................. 123/357; 73/119 A
[58] Field of Search ............... 123/357, 358, 359, 382, 123/383, 486, 488; 73/119 A; 60/601, 602, 603

[56] References Cited

U.S. PATENT DOCUMENTS 3,911,883 10/1975 Williams et al. .................... 123/357
4,292,806 10/1981 Moore et al. ......................... 60/600
4,372,266 2/1983 Hiyama et al. ...................... 123/357

FOREIGN PATENT DOCUMENTS 54-159529 12/1979 Japan .................................. 123/357

Primary Examiner—Magdalen Y. C. Moy

[57] ABSTRACT

An electronic control system for controlling the output of the fuel pump of a turbo supercharged compression ignition engine has a memory circuit which receives an engine speed signal and a fuel quantity signal and provides a derived air inlet manifold pressure signal for use in the remainder of the control system. The memory circuit stores test data relating to the variation of inlet manifold pressure as a result of varying the engine speed and fuel quantity. This overcomes the need to provide a manifold pressure transducer in an engine installation. A delay circuit is provided to compensate for turbo supercharger lag.

8 Claims, 3 Drawing Figures

ELECTRONIC CONTROL SYSTEM

This invention relates to an electronic control system for controlling the operation of a fuel injection pump intended to supply fuel to a turbo supercharged compression ignition engine.

With such a system it is necessary to take into account the pressure of air in the air inlet manifold of the engine in order that the control system can properly control the maximum amount of fuel which can be supplied to the engine.

It is known with mechanical pumps which are intended to supply fuel to a turbo supercharged engine, to provide a pressure sensor responsive to the inlet manifold pressure and to so design the sensor that it provides sufficient effort to position a mechanical stop which determines the maximum amount of fuel which can be supplied.

It is possible to provide such a sensor modified to provide an electrical signal to an electronic control system but the provision of such a sensor presents difficulty. If it is mounted on the engine manifold then it must be constructed so as to be able to withstand the engine vibration and it must be connected to the remaining part of the control system by cable. On the other hand if it is located in or adjacent the main portion of the control system it must be connected to the manifold by means of a pipe. In both cases it does represent a further item which can become faulty in use and which may be considered too expensive.

The object of the present invention is to provide an electronic control system for the purpose specified in a form in which a separate air inlet manifold pressure sensor is not required.

According to the invention an electronic control system for the purpose specified comprises a memory circuit in which can be stored test data relating to the variations of air inlet manifold pressure as a result of variation in at least one engine operating parameter, said engine operating parameter or parameters in use, being supplied to said memory circuit to provide a derived air inlet manifold pressure signal.

According to a further feature of the invention said control system includes a delay circuit which receives the derived air inlet manifold pressure signal and delays said signal in a manner to simulate the lag in the operation of the turbo supercharger.

Examples of electronic control systems in accordance with the invention will now be described with reference to the accompanying diagrams in which.

Figure 1:
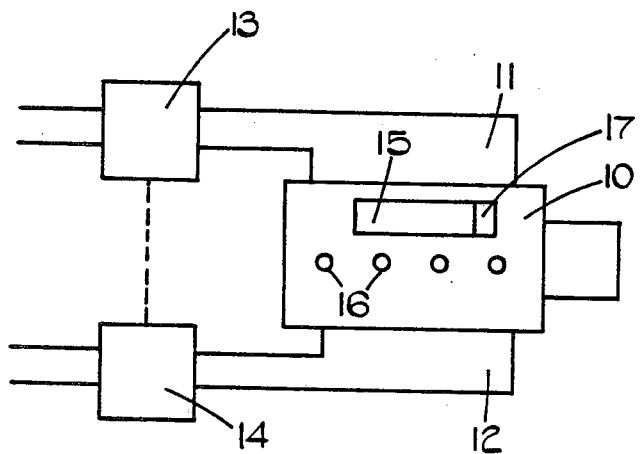
FIG. 1 is diagram of an engine layout.

With reference to FIG. 1 of the drawings there is shown a compression ignition engine 10 having an air inlet manifold 11 and an exhaust manifold 12. Air under pressure is supplied to the air inlet manifold 11 by means of a turbo supercharger including a compressor 13 and a turbine 14 the latter being driven by exhaust gases from the engine. In the drawing these two items are shown separate but in practice are mounted in the same housing. The engine is provided with a fuel injection pump 15 which supplies fuel in timed relationship to the injection nozzles 16 of the engine. The pump 15 is provided with an electromagnetic actuator 17 which may be coupled directly to the fuel quantity control of the pump or it may control the operation of a valve which in turn can vary a fluid pressure which is applied to a fuel quantity determining element of the fuel pump.

The supply of power to the actuator is determined by a main control portion 18 of the control system. The system includes three transducers 19, 20, 21, transducer 19 providing an engine speed signal, transducer 20 providing a signal representative of the amount of fuel being supplied by the pump to the engine and transducer 21 a demand signal, the transducer 21 being associated with an operator adjustable control such for example as a control pedal in the case of an engine installed in a road vehicle.

Figure 2:
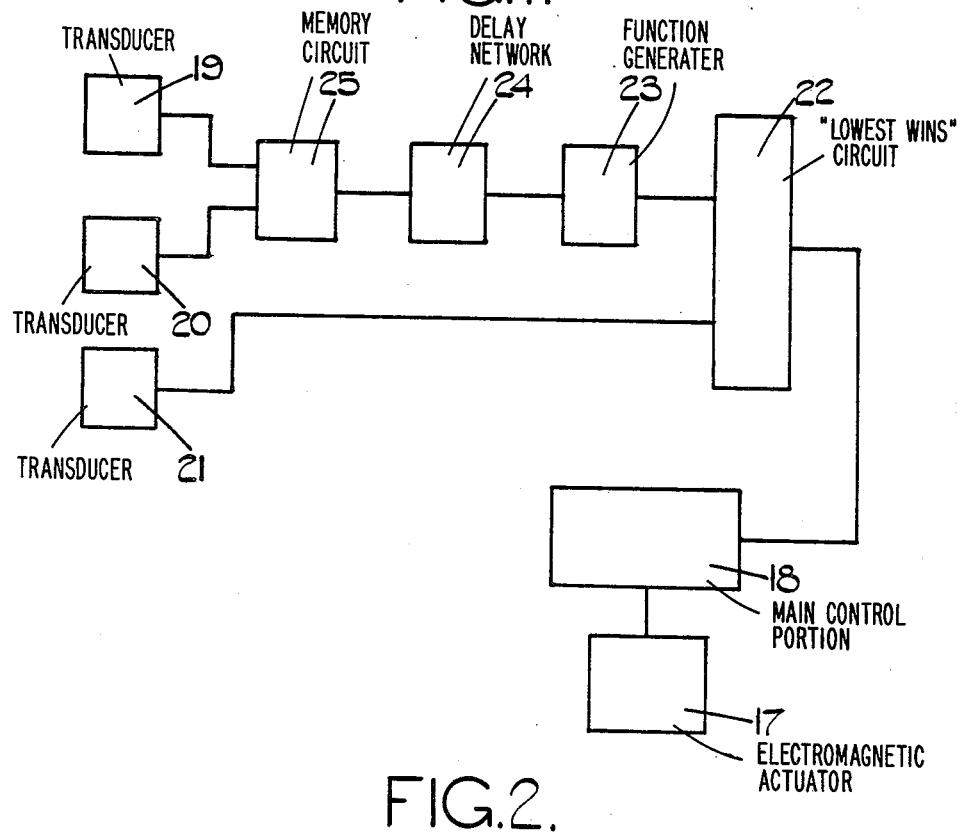
FIGS. 2 and 3 are block digrams respectively of two forms of electronic control system.

In FIG. 2 no direct connection is shown between the transducers and the main portion 18 of the control system. In practice however the main control portion will receive signals from the transducers 19 and 20 to enable it to perform an engine governing function and also to enable it to control accurately the amount of fuel being supplied to the engine.

The demanded fuel signal supplied to the main control portion is provided by a "lowest wins" circuit 22. This circuit has two inputs and it is the lower of the signals applied to the circuit which appears at its output. One input to the circuit 22 is derived from the transducer 21.

A signal is supplied to the other input of the circuit 22 from a function generator 23 which determines the maximum amount of fuel which can be supplied to the associated engine in accordance with the pressure in the air inlet manifold of the engine. Whichever of the signals derived from the transducer 21 or the function generator 23 is the smaller, will be applied to the control portion 18 to determine the current flowing in the actuator 17.

The function generator 23 can be provided with an input signal from a pressure sensor responsive to the pressure in the air inlet manifold of the engine. However in accordance with the invention the pressure sensor as such is omitted and a derived pressure signal is supplied to the function generator 23 by way of a delay network 24 which receives an input signal from a memory circuit 25. The memory cirucit 25 receives the signals provided by the transducers 19 and 20 and it contains stored information obtained as a result of tests carried out on the specific engine for which the control system is designed. During such tests a pressure sensor is provided on the air inlet manifold of the engine and the values of the manifold pressure obtained for different values of engine speed and fuel quantity, are stored. If open loop fuel control is used only by the pressure against engine speed is recorded. When the system and its associated engine are in operation the signals supplied to the memory circuit from the transducers 19 and 20 result in there appearing at the output of the circuit 25 a derived pressure signal. The information is stored in the memory circuit when the engine is operating at steady state conditions that is to say when sufficient time has lapsed for the speed of the turbo supercharger to attain a steady value following adjustment of either the engine speed or the amount of fuel supplied to the engine.

In practice following a change in engine speed or the amount of fuel supplied to the engine, the turbo supercharger takes some time to settle down to a steady speed thus for example if the engine is accelerated from a low speed the turbo supercharger will accelerate at a slower rate than the engine. The delay circuit 23 is inserted between the memory circuit 24 and the function generator 23 in order to take account of the lag of the turbo supercharger. As a result therefore the signal supplied to the function generator 23 closely follows the actual air pressure in the inlet manifold of the engine so that the circuit 23 can correctly decide the maximum fuel which can be supplied to the engine. If the signal provided by the function generator 23 is less than provided by the transducer 21, the signal provided by the function generator will be supplied to the control portion 18, and vice versa.

The delay circuit or network 24 may be a simple low pass filter and the function generator 23 may be similar to the memory circuit 25 except that it is provided with only one input and the data contained in it derived as a result of actual engine testing. It may be combined with the memory circuit and the combined circuit followed by the delay network.

Figure 3:
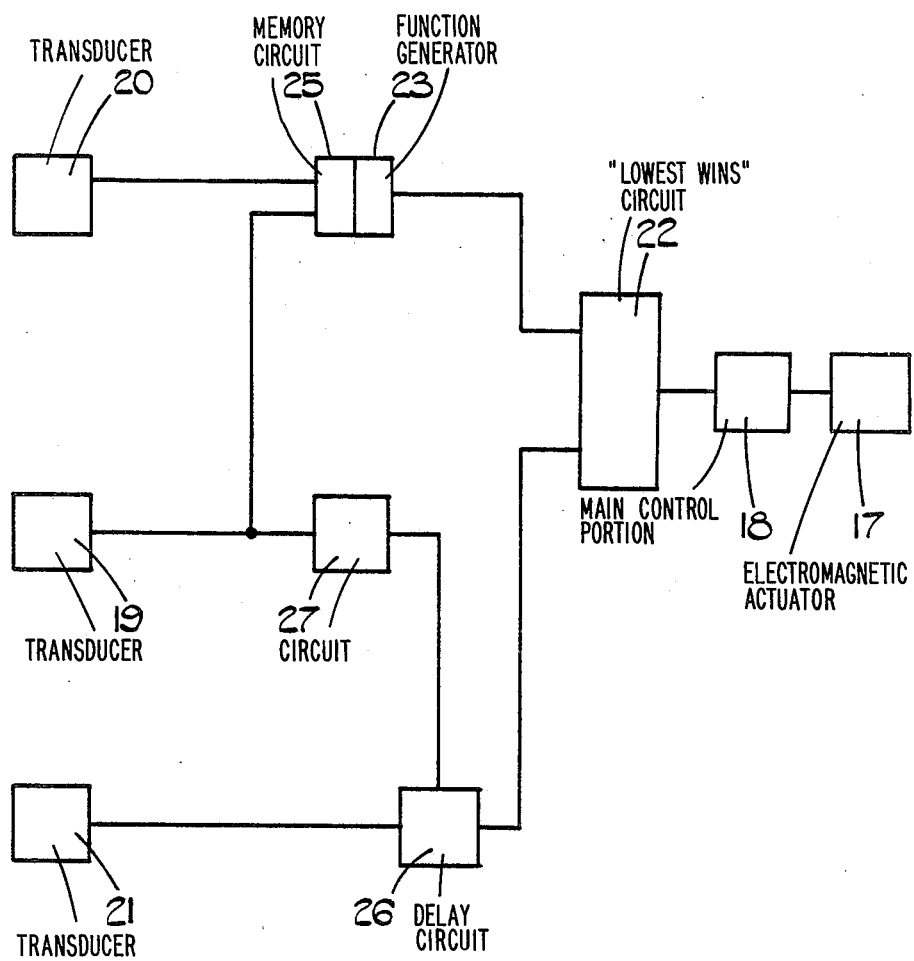

Alternatively as shown in FIG. 3, the derived pressure signal obtained from the memory circuit 25 can be applied directly to the function generator 23 and again if desired, the roles of these two circuits can be combined. Compensation for turbo supercharger lag is applied to the signal provided by the transducer 21 by a delay circuit 26. The compensation need only be applied when the signal provided by the transducer 21 exceeds a threshold value. The value can vary with engine speed and is decreased by a circuit 27 which is supplied with the engine speed signal. The threshold value determined by the circuit 27 is compared with the signal from the transducer and if the latter exceeds the instantaneous threshold value the delay circuit delays increases in the demand signal.

It is convenient for the control system to be computer based and with such a system it is particularly easy to modify the signal supplied by the transducer 21 when it exceeds the aforesaid threshold value.

It will be understood that the control system as described is not complete and would include other functions such as excess fuel control, maximum speed control and idle speed control.

We claim:

1. An electronic control system for controlling the operation of a fuel injection pump intended to supply fuel to a turbo supercharged compression ignition engine having an air inlet manifold, the system comprising a memory circuit in which can be stored test data relating to the variation of air inlet manifold pressure as a result of variation of at least one engine operating parameter, said engine operating parameter or parameters in use being supplied to said memory circuit to provide a derived air inlet manifold pressure signal.

2. A control system according to claim 1 including a delay circuit operable to delay the derived air inlet manifold pressure signal to compensate for the lag in the operation of the turbo supercharger of the engine.

3. An electronic control system for controlling the operation of a fuel injection pump which supplies fuel to a turbo supercharged compression ignition engine having an air inlet manifold, the pump including an electromagnetically controlled actuator for controlling fuel flow to the engine, the control system comprising first and second transducers responsive in use to two engine operating parameters, a memory circuit which receives the outputs of said transducers to provide a derived air inlet manifold pressure signal, said memory circuit containing test data relating to the variation of air inlet manifold pressure as a result of variation in said two engine operating parameters, a function generator which receives said derived air inlet manifold pressure signal and provides an output representing the maximum amount of fuel which can be supplied to the engine, a third transducer for providing a demand signal, circuit means for comparing the demand signal and the maximum fuel signal and for providing a demanded fuel signal and means receiving said demanded fuel signal and providing a control signal for said actuator.

4. A control system according to claim 3 including a delay circuit for delaying change in the maximum fuel signal to compensate for lag in the operation of the turbo supercharger.

5. A control system according to claim 4 in which said delay circuit is interposed between the memory circuit and the function generator.

6. A control system according to claim 3 in which said first transducer is responsive to the speed of the engine and said second transducer to the amount of fuel being supplied by the pump to the engine.

7. A control system according to claim 6 including a delay circuit for delaying the application of increasing demand signals to said circuit means, said delay circuit being inoperative when the demand signal is below a threshold value.

8. A control system according to claim 7 in which said threshold value is determined by a circuit responsive to the output signal of said first transducer.

* * * * *